(12) United States Patent
Kondo

(10) Patent No.: US 6,862,369 B2
(45) Date of Patent: Mar. 1, 2005

(54) IMAGE PROCESSING APPARATUS AND METHOD

(75) Inventor: Toshiaki Kondo, Singapore (SG)

(73) Assignee: Canon Kabushiki Kaisha, Tokyo (JP)

( * ) Notice: Subject to any disclaimer, the term of this patent is extended or adjusted under 35 U.S.C. 154(b) by 659 days.

(21) Appl. No.: 09/836,251

(22) Filed: Apr. 18, 2001

(65) Prior Publication Data

US 2002/0003900 A1 Jan. 10, 2002

(30) Foreign Application Priority Data

Apr. 25, 2000  (JP) .................................... 2000-124889

(51) Int. Cl.$^7$ .............................................. G06K 9/48
(52) U.S. Cl. ...................................... 382/199; 382/190
(58) Field of Search ................................ 382/190, 199, 382/201, 216, 195, 197, 198, 176

(56) References Cited

U.S. PATENT DOCUMENTS

| | | | | |
|---|---|---|---|---|
| 5,471,535 A | * | 11/1995 | Ikezawa et al. ............. | 382/199 |
| 5,748,778 A | * | 5/1998 | Onoguchi .................... | 382/199 |
| 5,923,786 A | * | 7/1999 | Murayama .................. | 382/242 |
| 5,940,538 A | * | 8/1999 | Spiegel et al. ............... | 382/236 |
| 5,995,649 A | * | 11/1999 | Marugame .................. | 382/154 |
| 6,252,985 B1 | * | 6/2001 | Mitsunaga et al. .......... | 382/199 |
| 6,400,831 B2 | * | 6/2002 | Lee et al. ..................... | 382/103 |
| 6,459,807 B1 | * | 10/2002 | Guest et al. ................. | 382/145 |

FOREIGN PATENT DOCUMENTS

| | | |
|---|---|---|
| JP | B2 2500439 | 11/1994 |
| JP | B2 2616552 | 8/1995 |
| JP | 8-335268 | 12/1996 |

OTHER PUBLICATIONS

Kass, Michael, A. Witkin, D. Terzopoulos, Snakes: Active Contour Models, International Journal of Computer Vision, vol. 1, No. 4, 1987, pp. 321–331.

* cited by examiner

Primary Examiner—Bhavesh M. Mehta
Assistant Examiner—Sheela Chawan
(74) Attorney, Agent, or Firm—Fitzpatrick, Cella, Harper & Scinto

(57) ABSTRACT

A technique for automatically extracting a region of interest from a set of a plurality of images includes a scheme exploiting a motion vector, and a scheme based on an active contour model. But these schemes suffer various problems (e.g., detection resolution and precision are low, resolutions in units of pixels cannot be obtained, versatility is poor, and so forth). To solve these problems, when initial contour information in an image sensed at reference time is input, a feature point selector selects a plurality of feature points from its contour line, and stores the connectivity between these feature points in a memory. A corresponding point seeker seeks a plurality of corresponding points, which respectively correspond to the plurality of selected feature points, from an image to be sought, which is sensed at another time, and the contour between the plurality of found corresponding points is extracted on the basis of the stored connectivity.

16 Claims, 21 Drawing Sheets

FIG. 4

| 3 | 2 | 1 |
|---|---|---|
| 4 | • | 0 |
| 5 | 6 | 7 |

FIG. 8A

| LABELING | 1 | 2 | 3 | CONTOUR DATA AND FEATURE POINTS |
|---|---|---|---|---|
| ADDRESS | A -------- B -------- C | | | |

FIG. 8B

| LABELING | 1 | 2 | 3 | NEW CONTOUR DATA |
|---|---|---|---|---|
| ADDRESS | A' ---- D -------- B' -------- E -------- C' -------- F | | | A' |

FIG. 8C

| LABELING | 1 | 2 | 3 | NEW FEATURE POINTS |
|---|---|---|---|---|
| ADDRESS | D -------- B' -------- C' ---- A' | E | F | D |

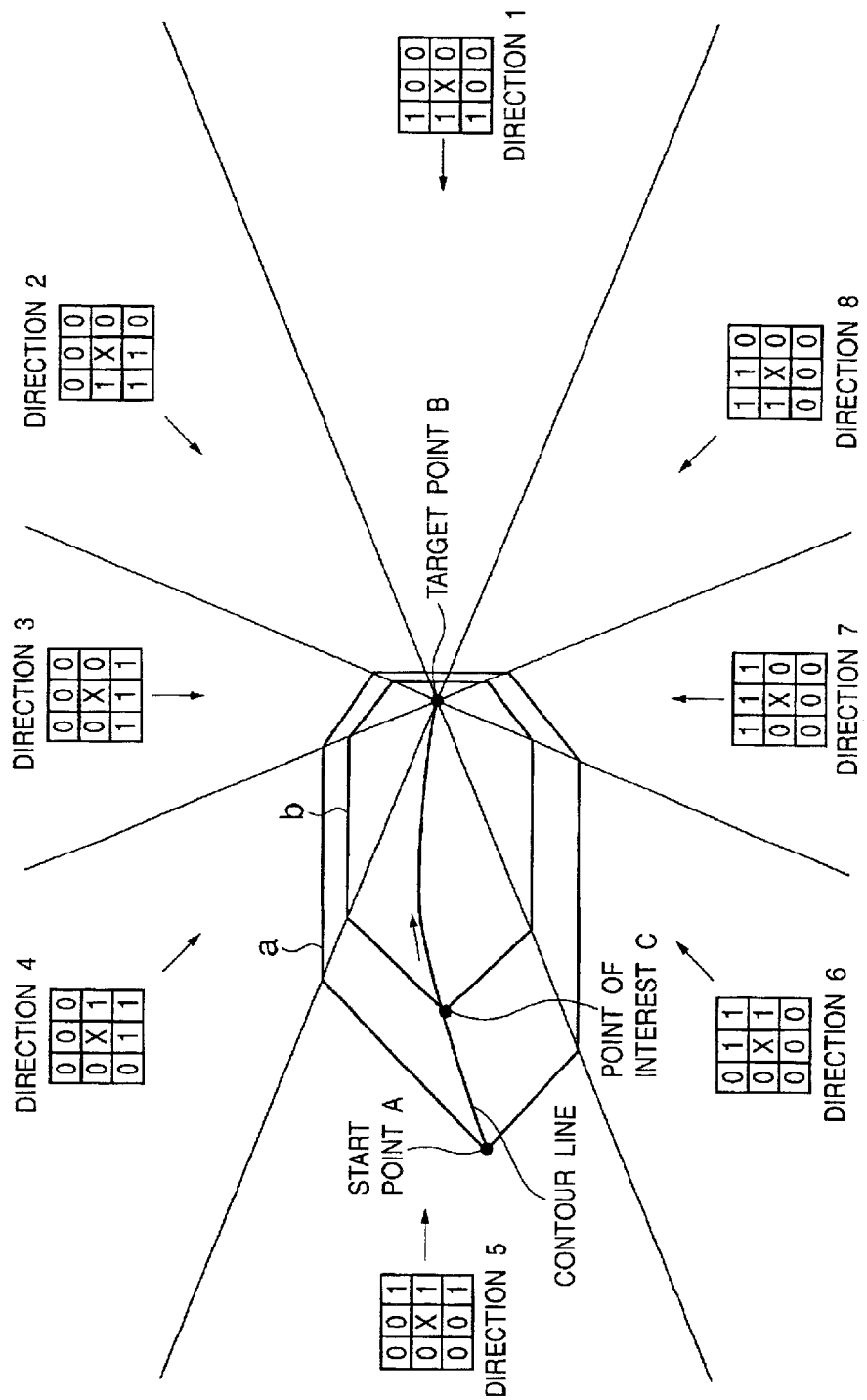

FIG. 18A

| 0 | 1 | 1 |
|---|---|---|
| 0 | X | 1 |
| 0 | 1 | 1 |

FIG. 18B

| 0 | 0.5 | 1 |
|---|-----|---|
| 0 | X   | 1 |
| 0 | 0.5 | 1 |

FIG. 18C

| 0 | 0 | 1 |
|---|---|---|
| 0 | X | 1 |
| 0 | 0 | 1 |

FIG. 18D

| 0 | 0 | 0.5 |
|---|---|-----|
| 0 | X | 1   |
| 0 | 0 | 0.5 |

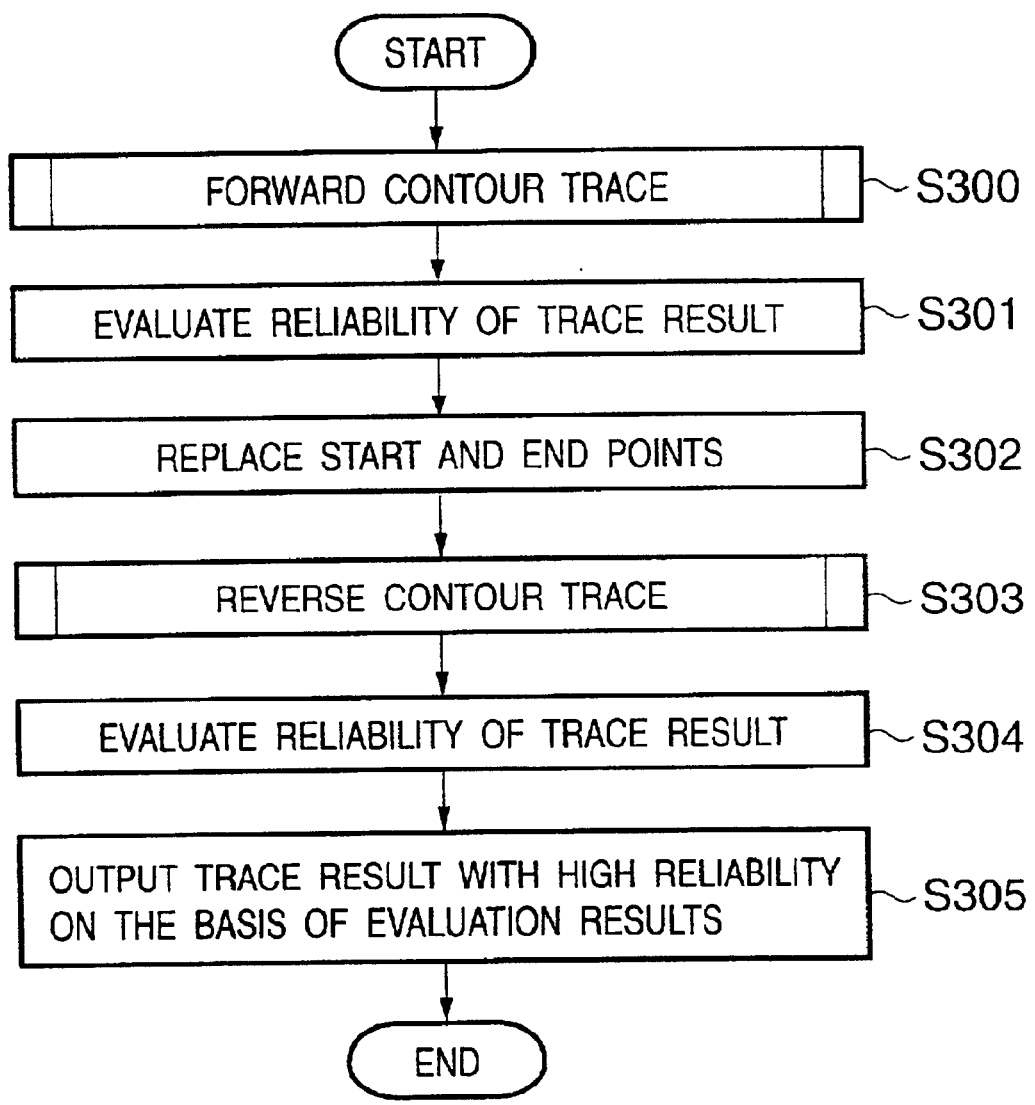

IMAGE PROCESSING APPARATUS AND METHOD

FIELD OF THE INVENTION

The present invention relates to an image processing apparatus and method and, more particularly, to an image processing apparatus and method for extracting a region of interest in a moving image or a multi-viewpoint image.

BACKGROUND OF THE INVENTION

Typical techniques for automatically extracting a specific region of interest from a set of a plurality of images include (1) a scheme exploiting a motion vector, and (2) a scheme based on an active contour model. Examples of schemes (1) and (2) will be explained below.

[Scheme Using Motion Vector]

U.S. Pat. No. 2,500,439 (Predictive Coding Scheme for Moving Image)

In motion-compensated inter-frame predictive coding of a moving image, it is a common practice to break up an input image into blocks each having a predetermined size, and to make motion-compensated inter-frame prediction in units of blocks. By contrast, in this patent, when a given block has a prediction error larger than a predetermined threshold value, it is determined that the block is highly likely to include a boundary of objects that make different motions, and the parent comprises means for segmenting that block into sub-blocks, and making motion-compensated inter-frame predictive coding in units of sub-blocks. That is, by increasing the resolution of the boundary between objects which make different motions, coding efficiency is improved.

U.S. Pat. No. 2,616,552 (Moving Image Encoding/Decoding Apparatus)

This encoding/decoding apparatus performs motion-compensated inter-frame prediction using motion vectors obtained in units of pixels of an input image. This apparatus has means for detecting contour line data of an object region from an input image, and accurately reproduces an abrupt change in motion vector near a contour line by inhibiting motion vectors of different objects from being used in interpolations upon computing motion vectors in units of pixels by interpolations, thereby improving coding efficiency.

Japanese Patent Laid-Open No. 8-335268 (Region Extraction Method)

Block matching between the previous and current frames is made under the assumption that the contour of a region of interest is given in the previous frame of an input moving image, thereby estimating the motion vector of a feature point on the contour. Then, the candidate position of the contour in the current frame is determined based on the estimation result of the motion vector. The gradient vector field of the current frame is computed in that contour candidate region. Finally, a third-order or cubic spline curve that passes through points corresponding to large vectors in the gradient vector field is generated, thus extracting a region of interest.

[Scheme Based on Active Contour Model]

With active contour models called Snakes described in M. Kass, A. Witkin, D. Terzopoulos, "Snakes: Active Contour Models", International Journal of Computer Vision, Vol. 1, No. 4, p. 321–331, 1988, the contour line of a region of interest is extracted by shrinking and deforming the contour to minimize the sum total of energy (internal energy) applied in correspondence with the contour shape, energy (image energy) applied in accordance with the nature of image, and energy (external energy) applied externally. The internal energy is defined to assume a smaller value as the shape of the contour line is smoother, the image energy is defined to assume a smaller value as the edge strength of an image on the contour line is higher, and the external energy is defined to assume a smaller value as the contour line is closer to an externally given point.

The aforementioned prior arts respectively suffer the following problems.

(1) U.S. Pat. No. 2,500,439: The Contour Line Resolution is Low

Even when the resolution is increased by decreasing the block size near the contour, it is merely a resolution in units of blocks, and contour data in units of pixels cannot be accurately obtained. Additional information for discriminating if a block has been broken up again is generated for each block, thus lowering the compression ratio.

(2) U.S. Pat. No. 2,616,552: Contour Detection Precision is Low

Four different contour detection methods have been explained, but respectively have the following problems.

A method of extracting a contour from difference data between the previous and current frames can extract a region with a large difference, but requires some post-processes such as thin line conversion and the like so as to extract a contour line from the region with the large difference.

A method of extracting a contour from difference data between contour data of the previous and current frames can extract a region with a large difference, but requires some post-processes such as thin line conversion and the like so as to extract a contour line from the region with the large difference, as in the above method.

A method of extracting a contour from the difference from a registered background image has poor versatility since the background is fixed.

A method of detecting motion vectors in advance, and extracting a contour from a position where the motion vector distribution changes abruptly can only obtain a contour line at a resolution as low as that in units of blocks from which motion vectors are detected.

(3) Japanese Patent Laid-Open No. 8-335268: Resolution in Units of Pixels Cannot be Obtained Since portions of contour data are expressed by a spline function, the contour of an object cannot be extracted with precision as high as that in units of pixels.

(4) Scheme Based on Active Contour Model

First, the versatility is poor. Parameters for determining the behavior of a contour model, i.e., the weighting coefficients of respective terms of the internal energy, image energy, and external energy must be empirically set for each input image, resulting in poor versatility.

Second, the result is too sensitive to initial setups of a contour. An accurate initial position must be given, and a low initial setup precision of the contour readily yields a minimal value of the energy distribution and cannot be easily converged to a correct contour.

Third, the computation volume is large, and it is hard to attain high-speed processes. In order to determine the moving direction of one node on a contour, the aforementioned energy values are obtained for neighboring points in all possible movable directions of that node, and such arithmetic operations must be made on all nodes on the contour, thus disturbing high-speed processes.

Fourth, this method is readily influenced by a false edge and noise near the contour. Since the image energy is defined to select a pixel having a high edge strength, if the strength of a false edge or noise near the contour line is higher than the edge strength of a true contour line, the false edge or noise is erroneously selected.

SUMMARY OF THE INVENTION

The present invention has been made to solve the aforementioned problems individually or together, and has as its object to extract a region of interest, which extends across a plurality of images such as a moving image, multi-viewpoint image, and the like, at high speed and high precision.

In order to achieve the above object, a preferred embodiment of the present invention discloses an image processing apparatus comprising: a selector, arranged to select a plurality of feature points on or near a contour line of a region of interest when a contour of the region of interest in a reference image sensed at reference time or viewpoint is input; a memory for storing a connectivity between the plurality of selected feature points; a seeker, arranged for seeking a plurality of corresponding points, which respectively correspond to the plurality of feature points, in an image to be sought, which is sensed at another time or viewpoint; and an extractor, arranged to extract a contour between the plurality of corresponding points as a region of interest of the image to be sought on the basis of the connectivity stored in said memory.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a view for explaining the principle of Freeman chain-code representation that expresses a line in a digital image;

FIGS. 8A to 8C are views for explaining the labeling update method shown in FIG. 2;

FIG. 17 shows contour traceable ranges when the screen masks shown in FIG. 16 are used;

FIGS. 18A to 18D show examples of screen masks using multi-valued weighting coefficients;

FIG. 21 is a flow chart showing the process of the fourth embodiment.

DESCRIPTION OF THE PREFERRED EMBODIMENTS

An image processing apparatus according to an embodiment of the present invention will be described in detail hereinafter with reference to the accompanying drawings.

Note that image data of a region of interest extracted by contour extraction to be described below is converted into data in the frequency domain, and then undergoes image processes such as quantization using a quantization method or table different from another region, variable-length coding, and the like.

First Embodiment

[Arrangement]

Figure 1:
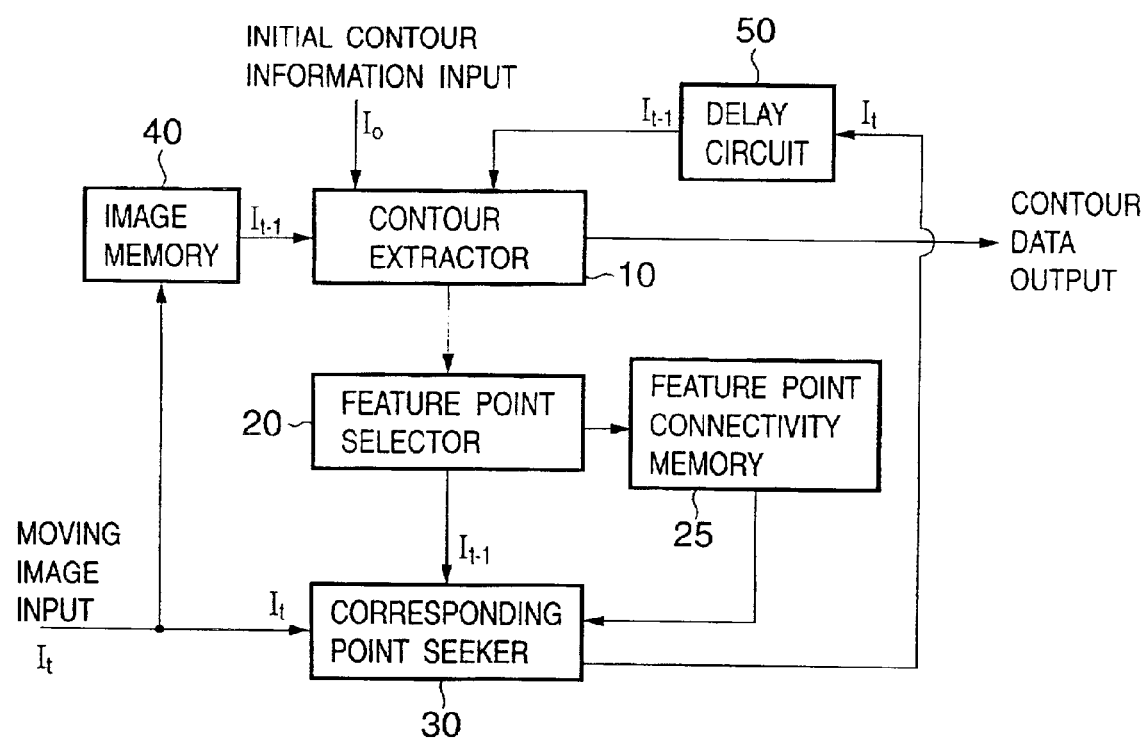
FIG. 1 is a block diagram showing an example of the functional arrangement of the first embodiment.

FIG. 1 is a block diagram showing an example of the functional arrangement of the first embodiment.

Referring to FIG. 1, reference numeral 10 denotes a contour extractor for extracting the contour of a region of interest in an input image; 20, a feature point selector for selecting a plurality of feature points present on or near the extracted contour; 25, a feature point connectivity memory for storing connectivities among the selected feature points; 30, a corresponding point seeker for searching an image obtained by sensing an object at another time or from another viewpoint for points corresponding to the plurality of feature points; 40, an image memory for storing an input image; and 50, a delay circuit for holding the addresses of a plurality of newly obtained feature points for a predetermined period of time.

Note that the present invention can be implemented by not only the apparatus with the arrangement shown in FIG. 1 but also by executing a program code having the following steps on a versatile personal computer or workstation: a program code which comprises at least the edge extraction step of extracting a contour of a region of interest of an image, the feature point select step of selecting feature points on the extracted contour line, the step of storing connectivities among the feature points in a memory, the corresponding point seek step of searching another image for points corresponding to the feature points, and the step of supplying the corresponding points to the contour extraction step, and which sequentially extracts regions of interest which extend across a plurality of images.

The functional blocks shown in FIG. 1 will be explained below in the order they operate.

Initial contour information of a region of interest in a reference image is input to the contour extractor 10. When time-series images such as moving images, continuous shot images, and the like are input, the operator may designate key points on the contour line of the region of interest in the initial image, or difference data between two, time-series images may be used. Note that a method of acquiring initial contour information of the region of interest is not particularly limited, and various other methods may be used without departing from the gist of the present invention.

A contour extraction method between feature points upon giving key points on the contour line as feature points or control points will be explained later. In this embodiment, time-series images will be exemplified as input images, but multi-viewpoint images may be used instead.

Figure 2:
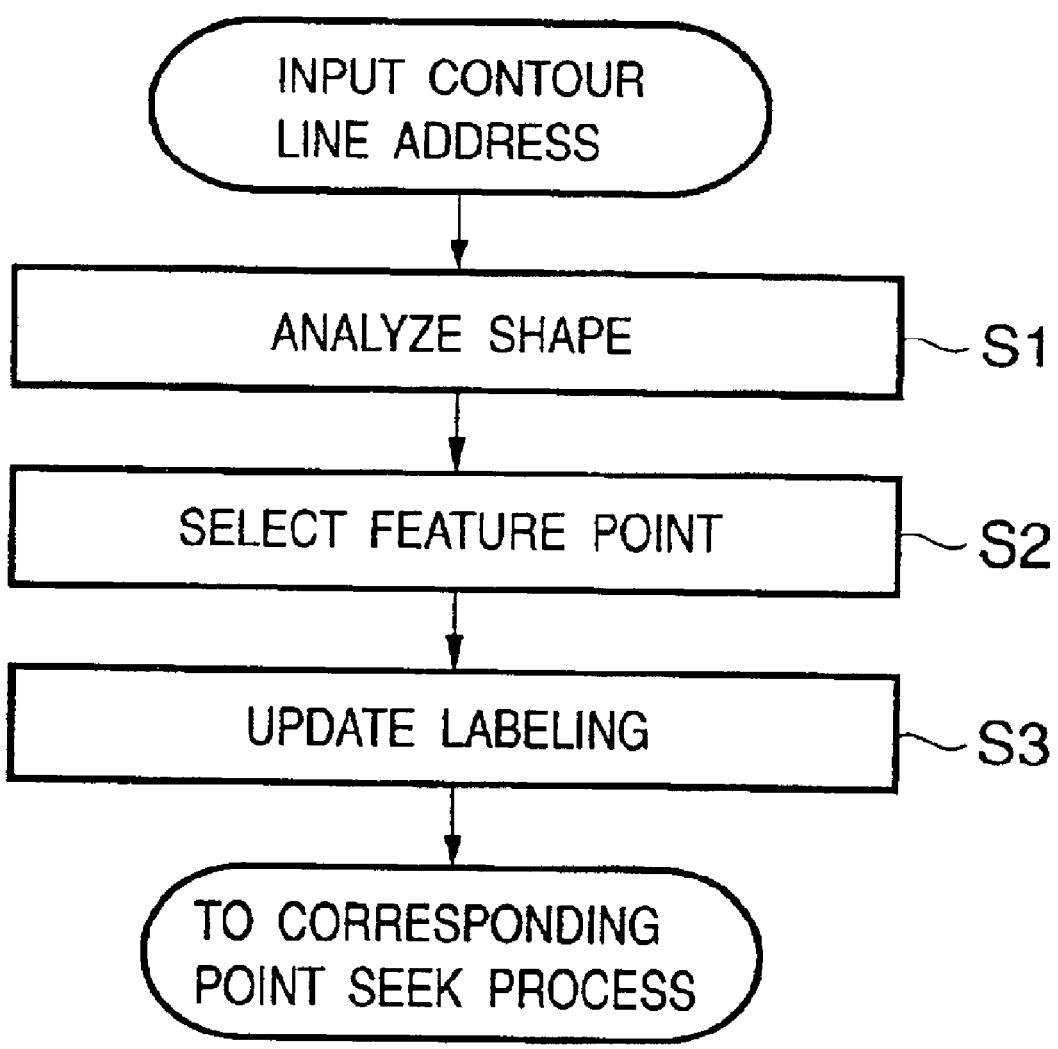
FIG. 2 is a flow chart for explaining a representative point select method.

The feature point selector 20 selects points that represent features of the contour line well on or near the contour line. FIG. 2 is a flow chart for explaining a representative point select method.

Figure 3:
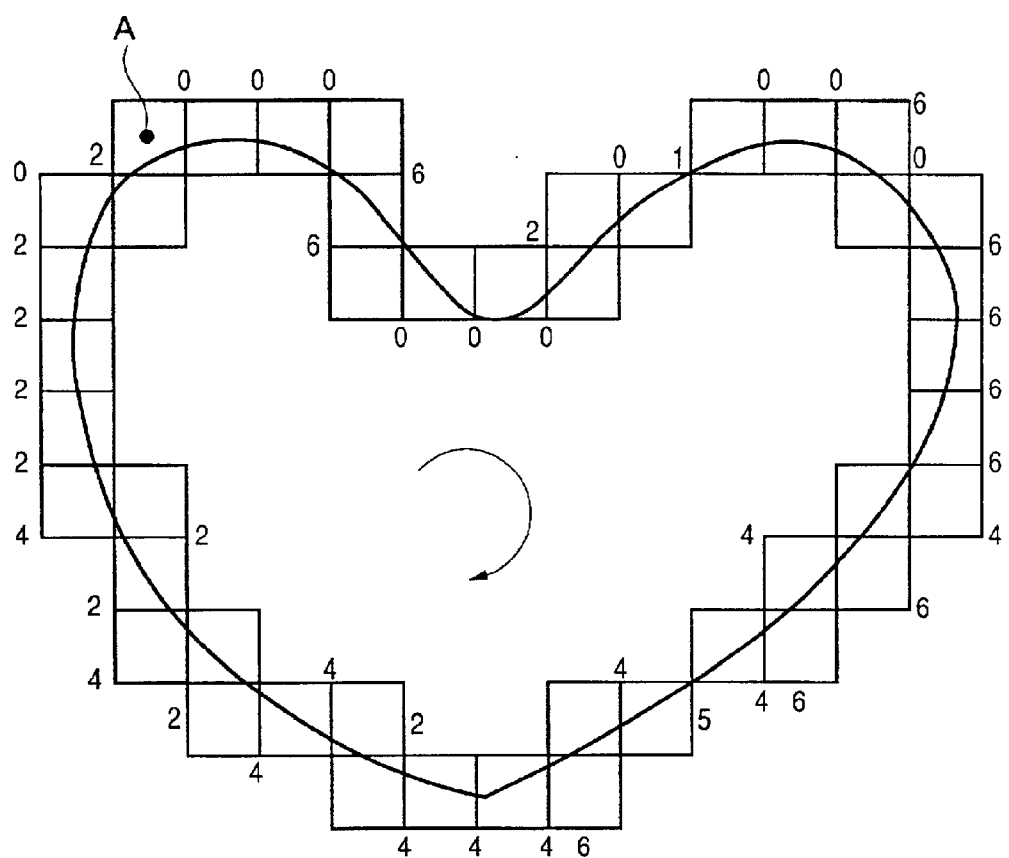
FIG. 3 is a view for explaining the principle of Freeman chain-code representation that expresses a line in a digital image.
Figure 4:
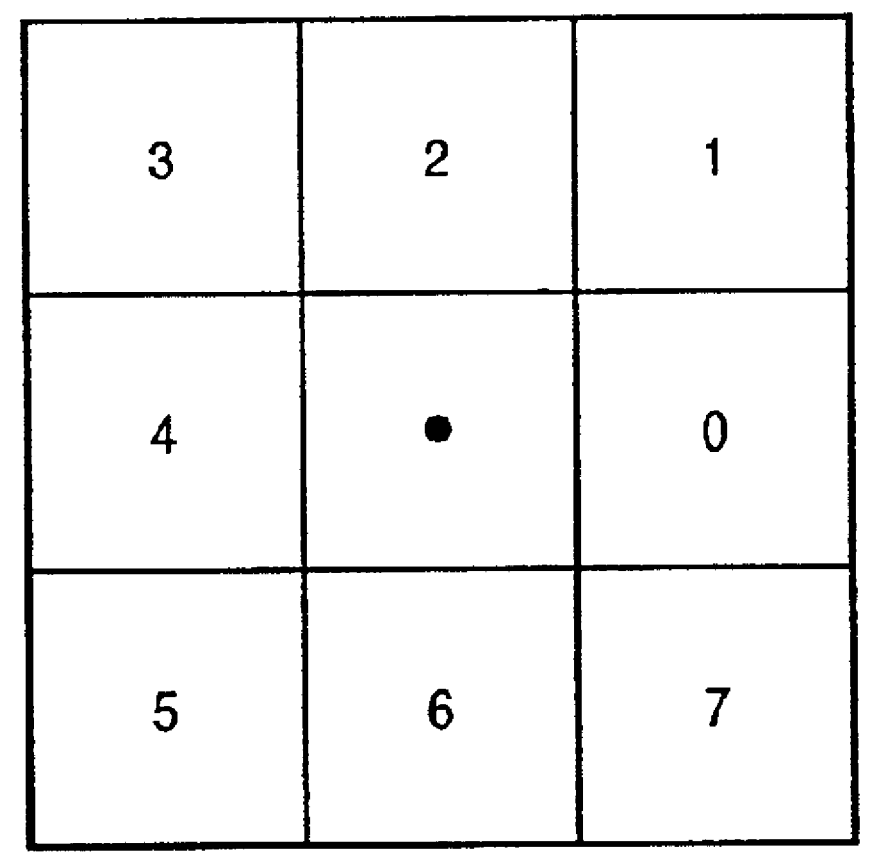

When address data of a closed curve that represents a contour line are input, the shape of the closed curve is analyzed in step S1 in FIG. 2. As a method of expressing lines such as straight lines, curves, closed curves, and the like in a digital image, Freeman chain-code representation is known. The principle of Freeman chain-code representation will be described below with reference to FIGS. 3 and 4. FIG. 3 shows a heart-shaped closed curve on a digital image, and the interior of that closed curve corresponds to the region of interest of the image. FIG. 4 shows quantization codes in eight directions, which are used to digitize the positional relationships between neighboring pixels on the contour lines. When the closed curve in FIG. 3 is described clockwise to have point A as a start point, it is digitized to be 00066000201006. . . .

In step S2, points where the direction of the contour line changes abruptly are selected based on Freeman chain codes. For example, points where the codes change from 0 to 6, 6 to 0, 0 to 2, 2 to 0, and so forth indicate that the path of the contour line is bent through 90°, and corners of the contour line can be easily detected. However, many points where the contour line path is bent through 90° can be present on the contour line. For example, an oblique 45° straight line repeats 90° inflections at a short period like 64646464. . . . For this reason, no feature point is selected from inflections which repeat at a predetermined period or less.

Figure 5:
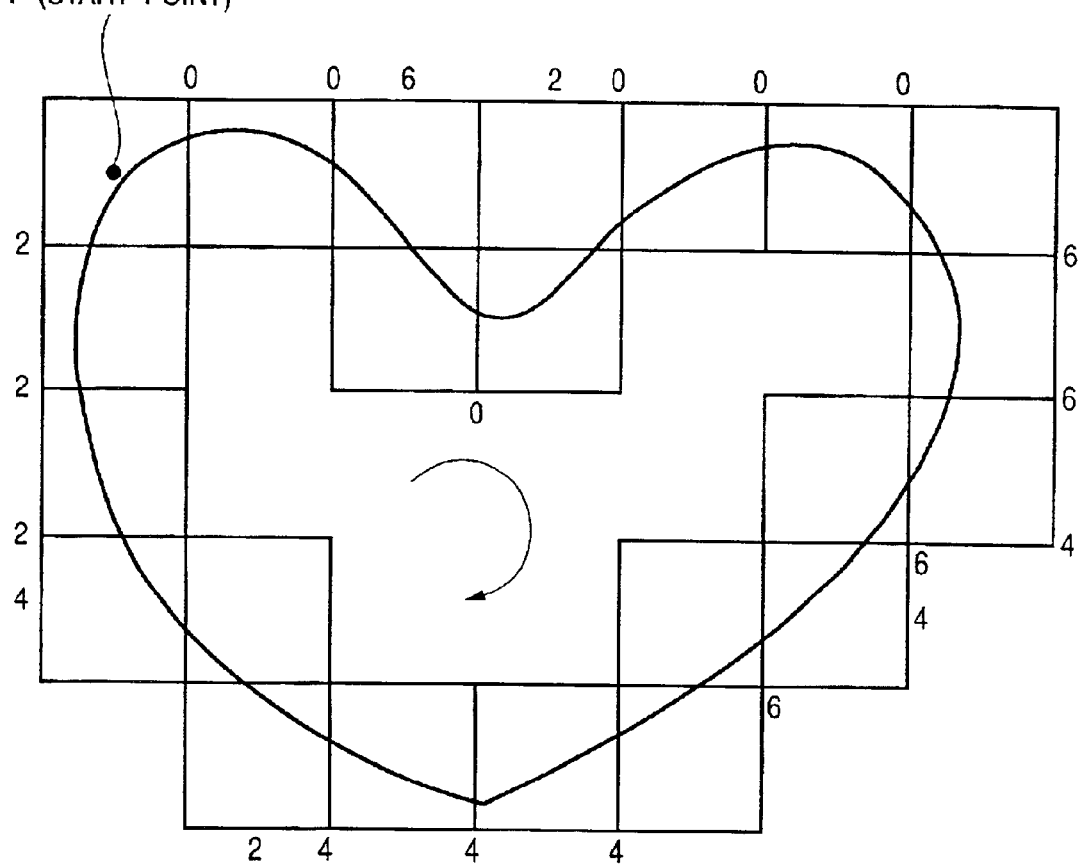
FIG. 5 is a view showing a state wherein the resolution of the digital image shown in FIG. 3 is reduced to ½ in both the horizontal and vertical directions.

In order to maintain an appropriate number of feature points, it is effective to, e.g., decimate a Freeman chain code or to reduce the resolution of the image itself, in addition to the aforementioned process. FIG. 5 shows a state wherein the resolution of the digital image shown in FIG. 3 is reduced to ½ in both the horizontal and vertical directions. Freeman chain codes are generated clockwise to have point A' shown in FIG. 5 as a start point in units of coarse pixels each defined by four pixels of an original image so as to extract large inflection points on the path of the contour line. Since the resolution lowers, feature points remain en grand, and unnecessarily fine points of inflection are removed.

Acute corners which make an angle of inflection less than 90°, and obtuse corners which make an angle of 135° or larger are selected as feature points without any omissions. Also, at least three feature points are selected to generate a closed curve.

Figure 6:
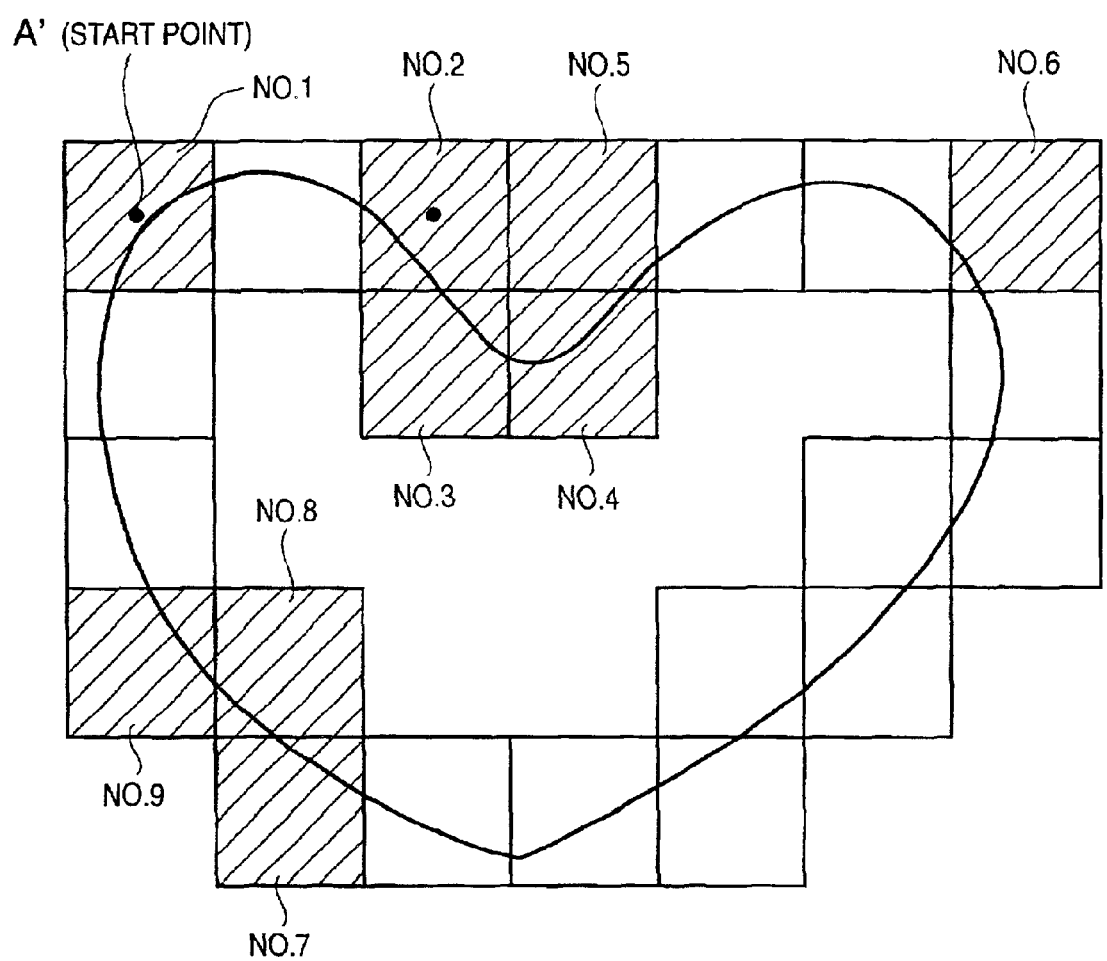
FIG. 6 is a view showing nine feature points selected from the closed curve shown in FIG. 5.

The feature point connectivity memory 25 stores connectivities among the feature points selected by the feature point selector 20. FIG. 6 shows nine feature points selected from the closed curve shown in FIG. 5, and feature points are indicated by hatching. The feature points are labeled clockwise from No. 1 to No. 9 to have point A' as a start point in the order the Freeman chain codes are generated. Feature points having serial labeling numbers or the first (No. 1) and last (No. 9) feature points form a pair used in contour trace. The labeling numbers assigned to the feature points are taken over when the corresponding point seeker 30 searches the next frame for corresponding points of the feature points of the current frame.

The labeling update method in step S3 shown in FIG. 2 will be described below using FIGS. 7A to 8C in association with the contour extractor 10, corresponding point seeker 30, and the like, which are connected before and after the memory 25.

Figure 7A:
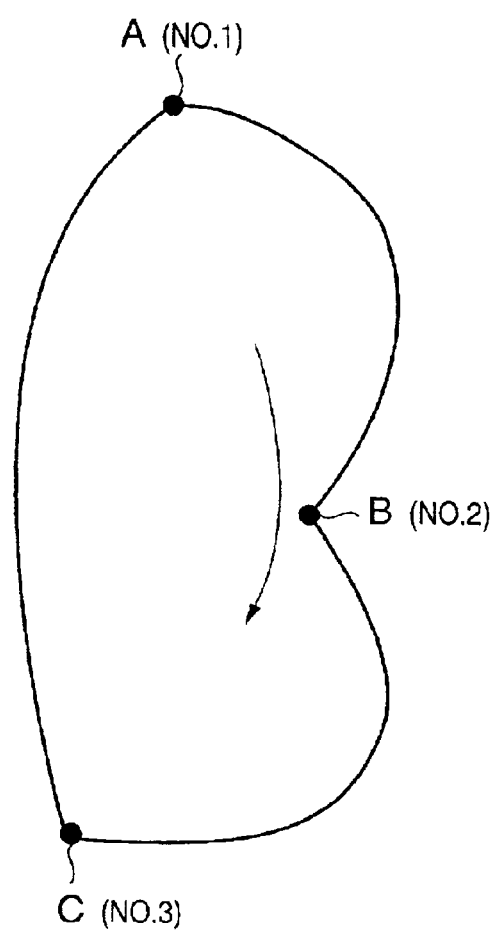
FIGS. 7A and 7B are views for explaining a labeling update method shown in FIG. 2.

FIG. 7A shows the contour line of a region of interest at given time. Three feature points A, B, and C are selected, as shown in FIG. 7A. The data of this contour line are stored in a linear sequence to have a given feature point as a head point, as shown in FIG. 8A. The selected feature points A, B, and C are labeled No. 1, No. 2, and No. 3 in the order they appear.

Figure 7B:
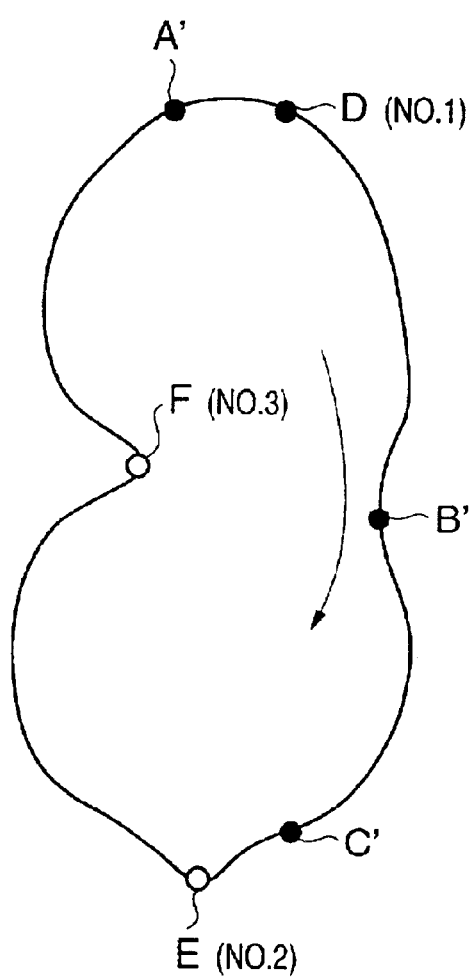

FIG. 7B shows the contour line of the region of interest after an elapse of a predetermined period of time, i.e., a state wherein the shape has changed. Corresponding points A', B', and C' of the feature points A, B, and C are obtained by the corresponding point seeker 30 (to be described later). The contour extractor 10 extracts the contour line of the region of interest after an elapse of a predetermined period of time using these corresponding points A', B', and C' as passing points. Contour line data immediately after contour extraction are stored in a linear sequence having the head feature point A the predetermined period of time before, as shown in FIG. 8B. The feature point selector 20 selects new feature points D, E, and F from the contour data shown in FIG. 8B. FIG. 8C shows contour data by shifting the addresses so that the feature point D is located at a head position. The new feature points D, E, and F are newly labeled No. 1, No. 2, and No. 3 in the order they appear, and are stored in the feature point connectivity memory 25. Also, the new feature points D, E, and F become new reference pixels which are used to search for the next corresponding points by the corresponding point seeker 30.

As described above, in step S3 in FIG. 2, feature point update, delete, and addition processes (to update labeling) are automatically executed in accordance with a change in shape of an object.

The corresponding point seeker 30 searches the next frame for points corresponding to the plurality of feature points extracted by the feature point extractor 20. Correspondence of feature points can be determined at high speed by block matching using blocks each consisting of each feature point and its neighboring pixels. However, that correspondence method is not limited to block matching, but any other methods may be used if they fall within the scope of the present invention.

The image memory 40 is a storage device such as a frame memory for temporarily storing image data, and contour extraction of the contour extractor 10 is done while reading out image data stored in the image memory 40. The delay circuit 50 temporarily stores address data of feature points in the latest image, which are extracted by the corresponding point seeker 30 so as to synchronize them with image data read by the contour extractor 10 from the image memory 40.

[Contour Extractor]

Figure 9:
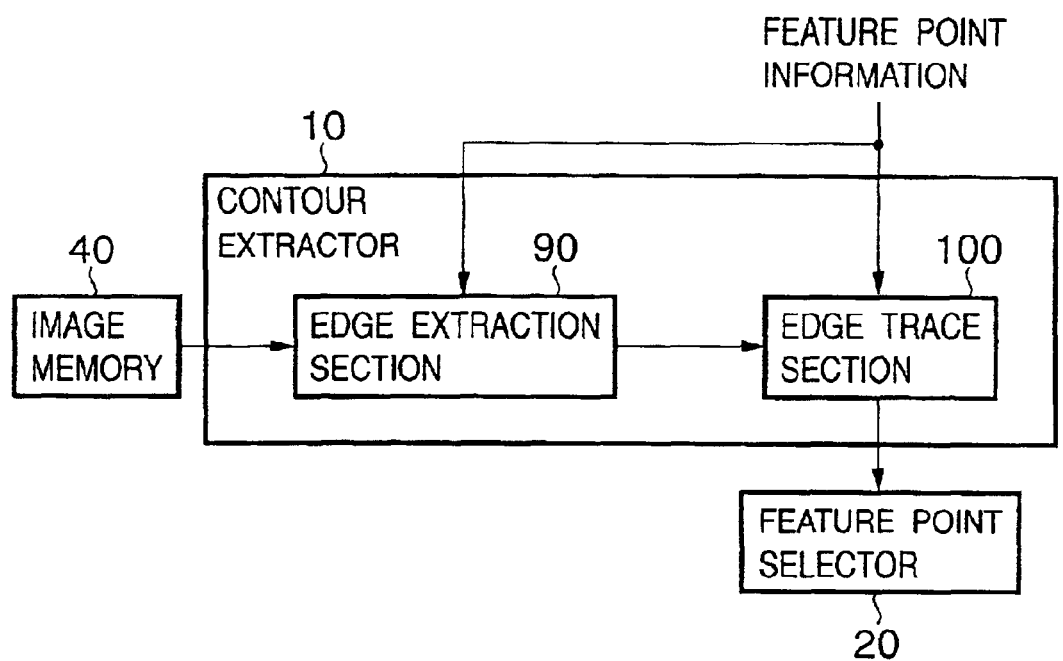
FIG. 9 is a block diagram showing an example of the internal arrangement of a contour extractor.

The internal process of the contour extractor 10 will be described in detail below. FIG. 9 is a block diagram showing an example of the internal arrangement of the contour extractor 10.

An edge extraction section 90 extracts edge components from an image supplied from the image memory 40. An edge trace section 100 traces pixels with large edge strength in turn to have one of two connected feature points as a start point and the other as an end point. In this edge trace process, Freeman chain codes are automatically generated, and are supplied to the feature point selector 20 together with the edge trace result.

An edge extraction method in the edge extraction section 90 may be implemented by either a space differential process represented by Sobel operators, Laplacian operators, and the like, or template matching using Prewitt operators, Kirsch operators, and the like. That is, the scheme to be adopted is not particularly limited as long as edge extraction can be achieved. Note that the edge extraction process may be limited to a contour extraction period, and a contour traceable range determined by a screen mask (to be described later) so as to reduce the arithmetic operation volume of edge extraction. Furthermore, the edge extraction section 90 may be built in the edge trace section 100, and at the instance when the addresses of neighboring pixels, whose edge strengths are to be compared, are determined, only those neighboring pixels may undergo edge extraction.

Figure 10:
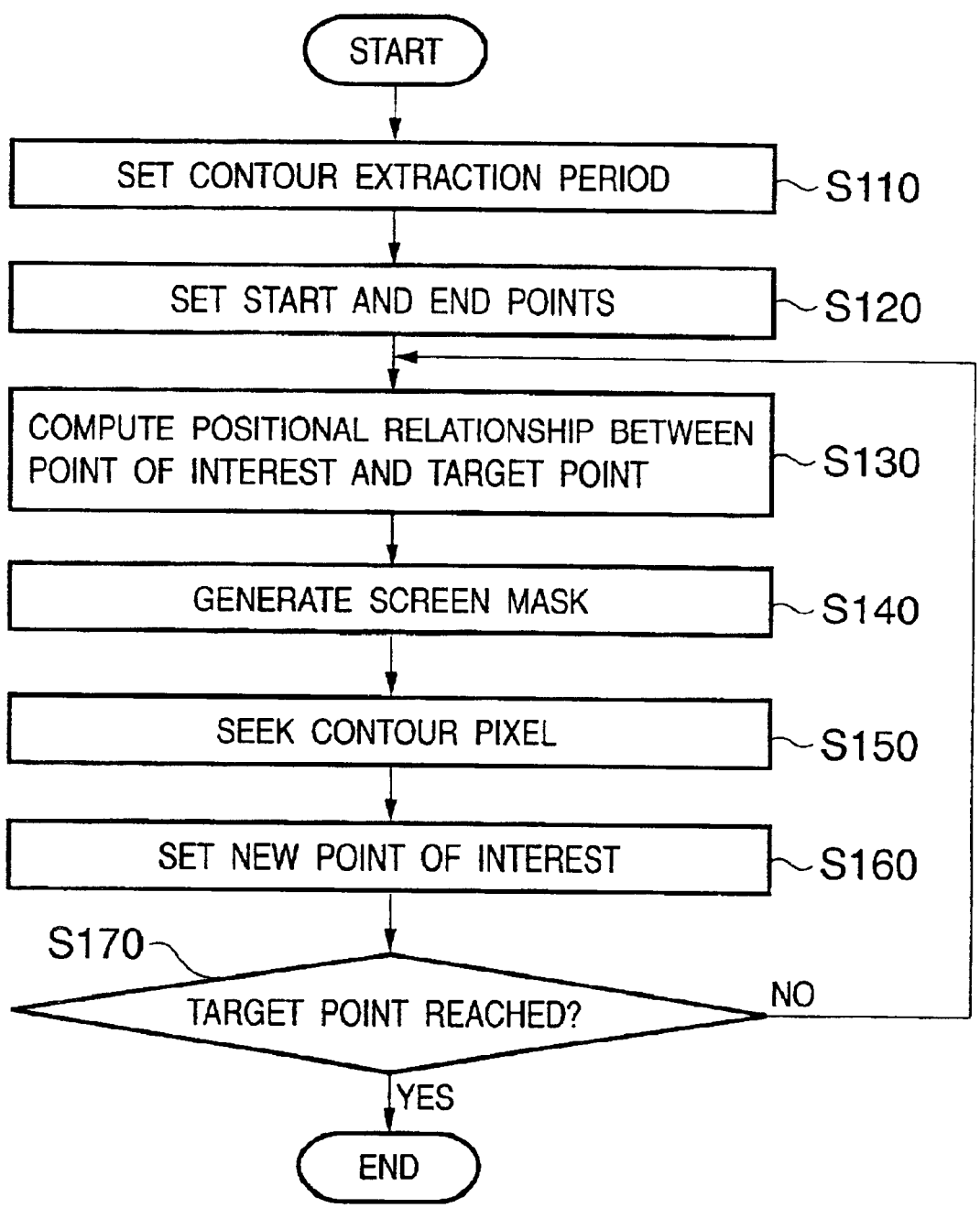
FIG. 10 is a flow chart that best illustrates the internal process of an edge trace section shown in FIG. 9.

FIG. 10 is a flow chart which best illustrates the internal process of the edge trace section 100.

A contour period to be extracted is set (S110), and its two end points (start and end points) are set to have the start point of the set contour period as an initial position of the point of interest, and the end point as the target point of contour trace (S120). The positional relationship between the point of interest and target point is computed (S130), a screen mask that limits the field of view of neighboring pixels of the pixel of interest is generated (S140), neighboring pixels of the pixel of interest are searched for a pixel having a maximum edge strength (S150), and the found contour pixel is set as a new point of interest (S160). It is checked in step S170 if the new point of interest matches the target point.

Contour line data are formed by recording addresses (coordinate values) of points of interest, and Freeman chain codes are generated by sequentially recording the moving directions of the points of interest.

The processes of the individual steps shown in FIG. 10 will be described in detail below.

The operator can set the contour extraction period in step S110 by designating two end points that sandwich a contour period to be extracted, using a pointing device such as a mouse or the like on an initial screen of contour trace. More specifically, the operator moves the mouse cursor on the screen to place it near the end point of the contour period to be extracted, and presses a mouse button. After the initial screen, the contour extraction period is set by a pair of connected feature points which are supplied from the corresponding point seeker 30.

In step S120 of the initial screen, at the instance when the mouse button is pressed, pixels within a given distance range having the position pointed by the mouse cursor as the center are searched for a pixel having the highest edge strength. Likewise, in step S120 after the initial screen, connected pixels within a given distance range having a feature point which is supplied from the corresponding point seeker 30 are searched for a pixel having the highest edge strength. The position of the found pixel is determined to be an end point, a point designated first is set as the start point, and a point designated next is set as the end point. Note that the start point is the initial position of the point of interest, and the end point is the target point in contour trace.

In step S130, the positional relationship between the point of interest and target point is computed. More specifically, the angle the point of interest makes with the target point is computed with reference to the target point. Let (x0, y0) be the coordinate position of the point of interest, and (x1, y1) be that of the target point. Then, an angle θ the two points make with each other is given by:

$$\theta = \tan^{-1}\{(y0-y1)/(x0-x1)\} \quad (1)$$

Figure 11:
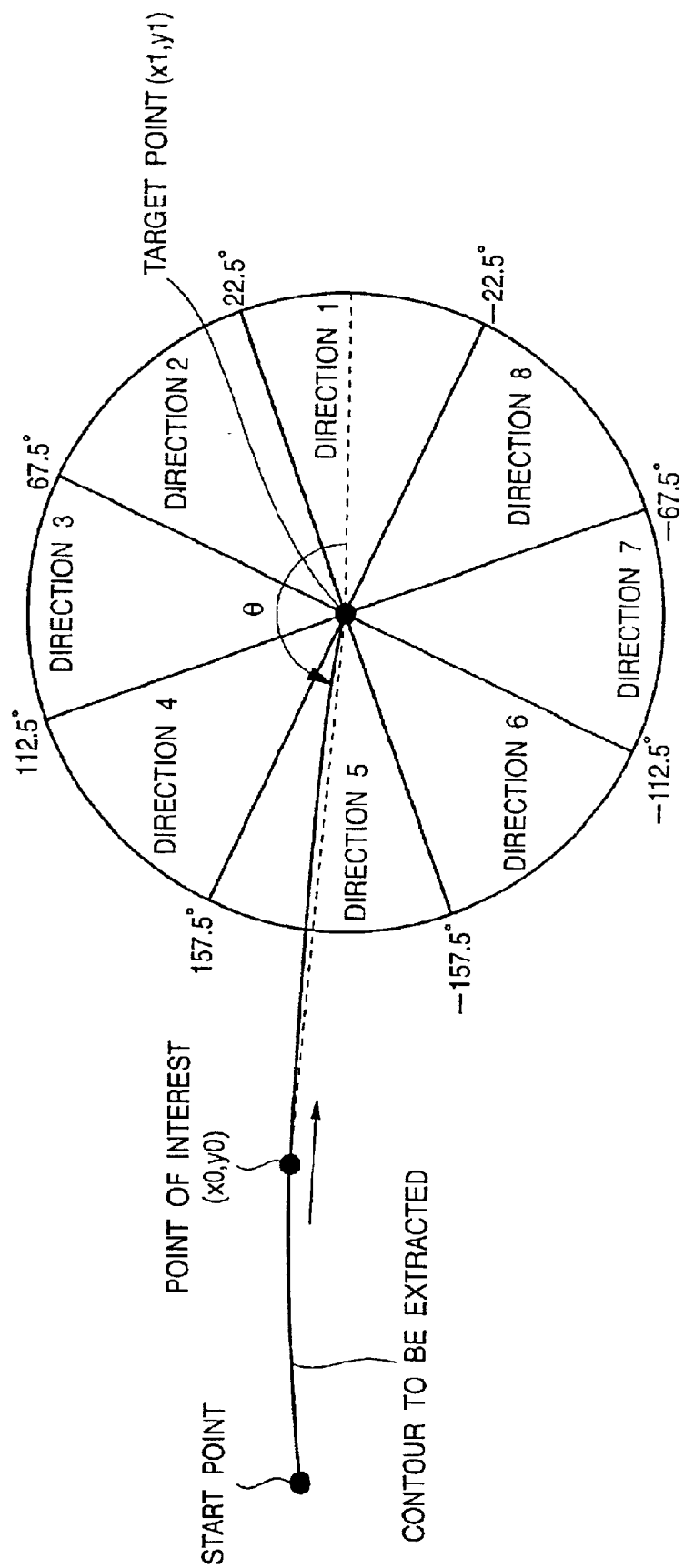
FIG. 11 is a view showing categories of angles the point of interest and the target point make with each other.

The angle θ given by equation (1) is categorized into one of eight directions in 45° increments, i.e., direction 1 (from −22.5° to +22.5°), direction 2 (from 22.5° to 67.5°), direction 3 (from 67.5° to 112.5°), direction 4 (from 112.5° to 157.5°), direction 5 (from 157.5° to 180° and from −180° −157.5°), direction 6 (from −157.5° to −112.5°), direction 7 (from −112.5° to −67.5°), and direction 8 (from −67.5° to −22.5°), as shown in FIG. 11. Note that the arithmetic operation described by equation (1) can be implemented at high speed using a look-up table.

Figure 12:
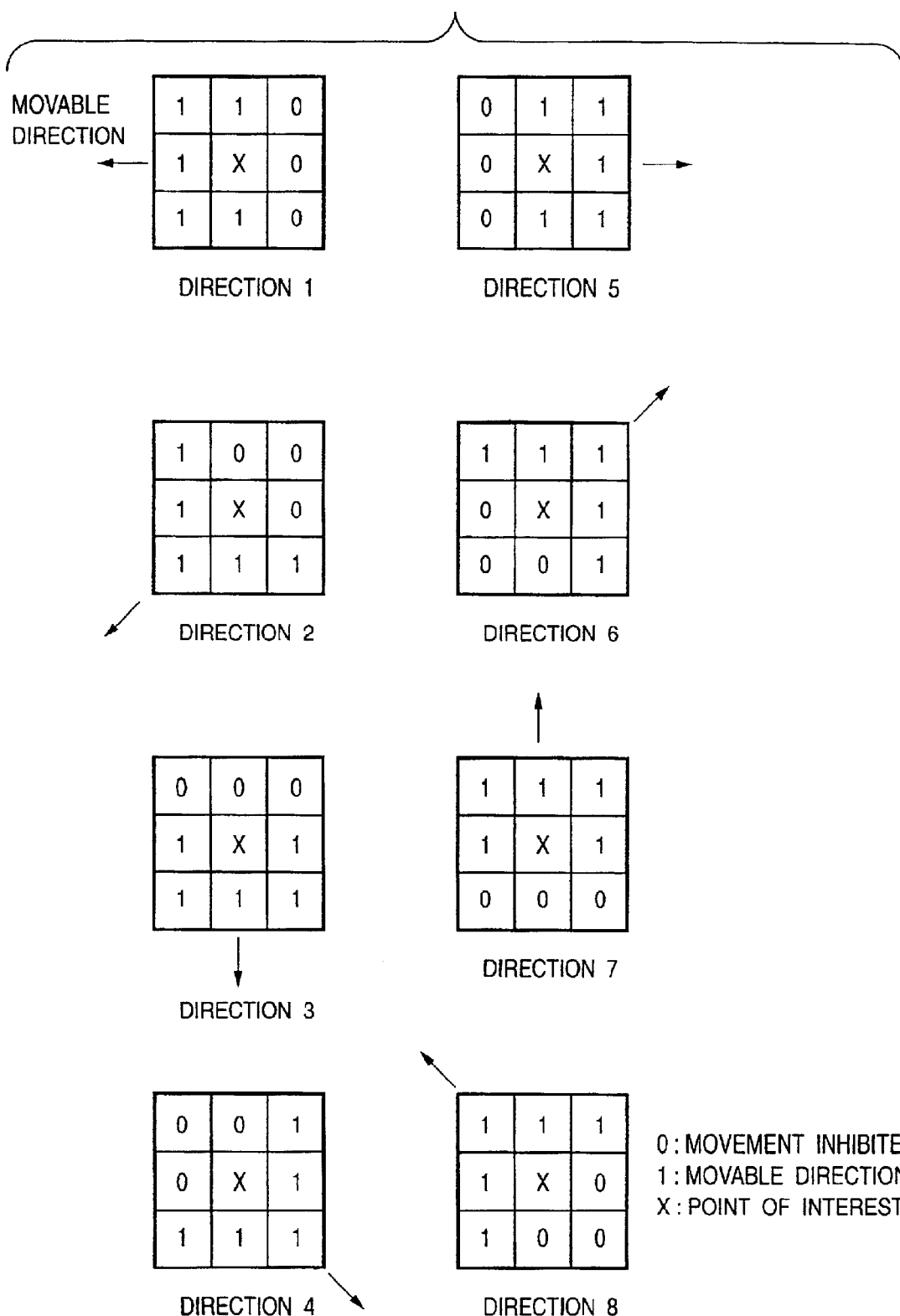
FIG. 12 shows examples of screen masks.

In step S140, neighboring eight pixels having as the center the point of interest on the contour line which is being traced are masked by screen masks (FIG. 12) corresponding to the eight directions. In FIG. 12, the position of the point of interest is indicated by a mark x, "1" indicates a movable pixel, and "0" indicates a movement-inhibited pixel, i.e., masked pixel. This screen mask includes five movable pixels and three movement-inhibited pixels, and imposes restrictions to assure convergence on the target point while allowing relatively free contour trace.

In step S150, neighboring pixels which are not masked in step S140 are searched for a pixel having the highest edge strength. In step S160, a pixel position moves by one pixel to the next point of interest as the pixel found in step S150.

Figure 13:
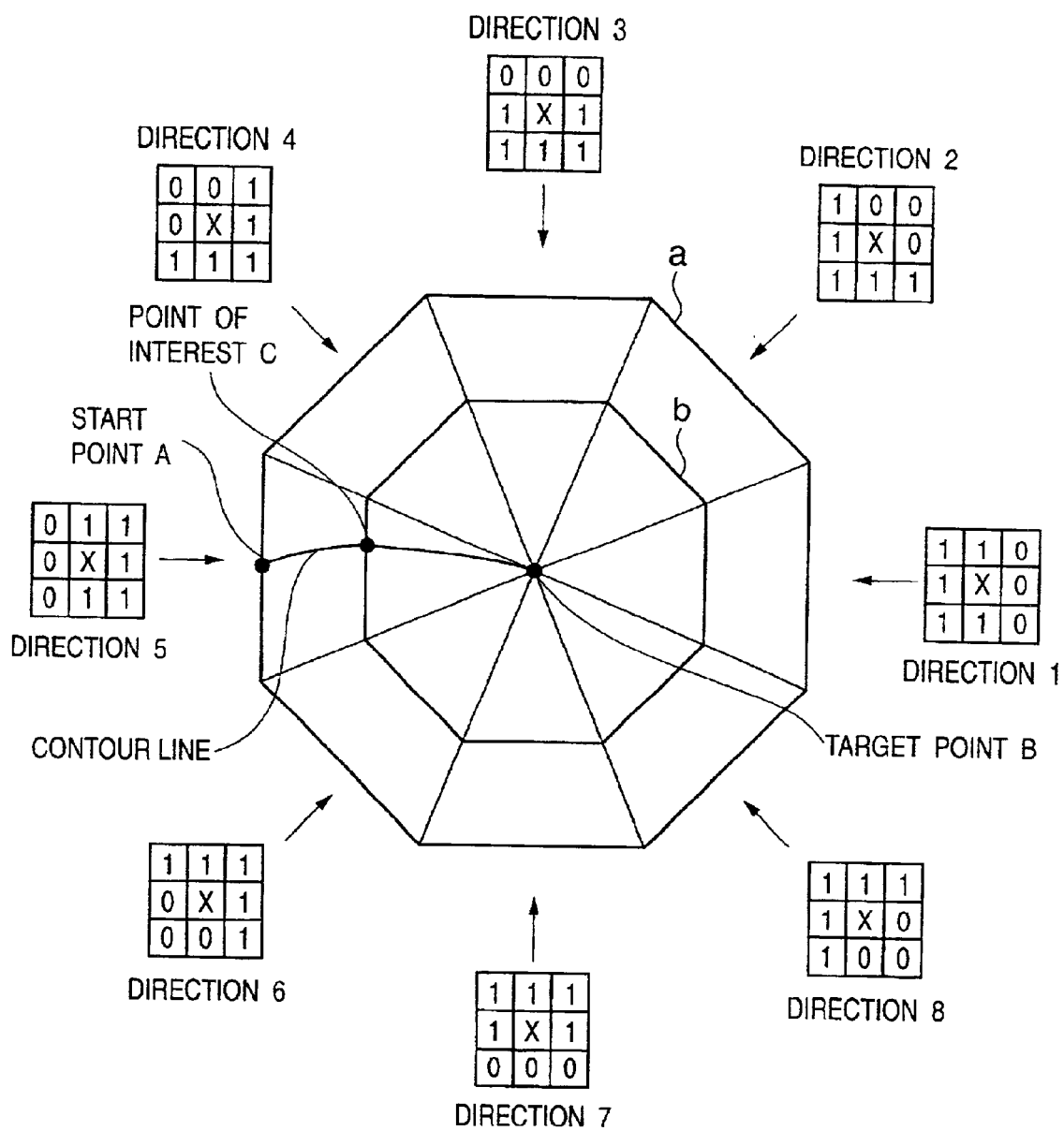
FIG. 13 shows movable ranges of contour trace.

FIG. 13 shows movable ranges of contour trace according to this embodiment.

A contour traceable range allows free trace except for a direction to recede from target point B. At the instance when point C of interest is located at start point A, i.e., at the beginning of contour trace, the point of interest can move within a maximum of the range of octagon a. However, point C of interest does not always freely move within the range of octagon a before it reaches end point (target point) B, and the movable region is limited to the range of octagon b after it reaches the contour of, e.g., octagon b. In this way, the octagon as the movable range gradually reduces as the point of interest becomes closer to target point B, thus reliably guiding the point of interest to target point B.

It is checked in step S170 if point C of interest has reached end point B. If end point B has not been reached yet, the flow returns to step S130 to repeat processes in steps S130 to S160 for new point C of interest. If it is determined in step S170 that point C of interest has reached end point B, the contour extraction process ends.

In this embodiment, a mask that prevents the point of interest from receding is provided in addition to the screen masks.

Figure 14:
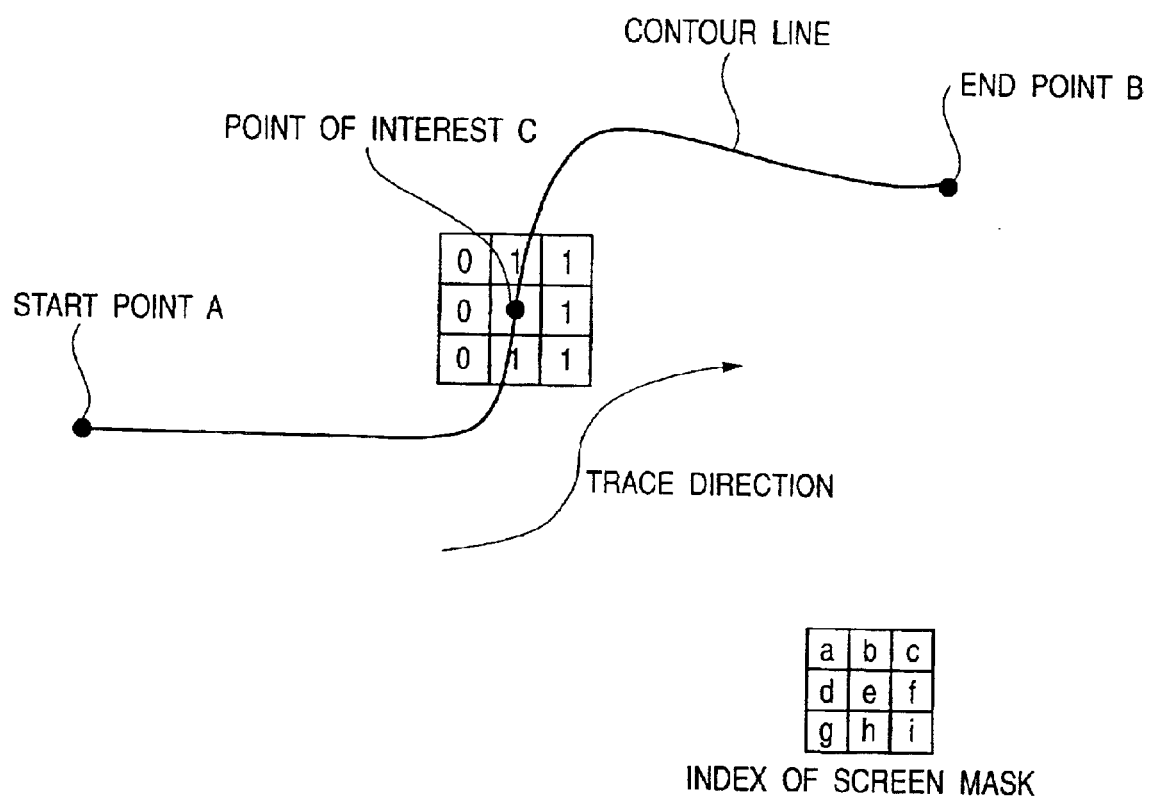
FIG. 14 shows a contour line and a point of interest which is tracing the period of the contour line.

FIG. 14 shows contour line A–B, and point C of interest which is tracing that period. When point C of interest has reached a position illustrated in FIG. 14, since the positional relationship with end point B as a target point belongs to direction 5 (from 157.5° to 180° and from −180° to −157.5°), the screen mask of direction 5 allows movements in directions b and h (up and down), direction f (right), direction c (upper right), and direction i (lower left). In the example in FIG. 14, since edges are present at pixel b above point C of interest, and pixel h below point C, the moving path is limited to two, i.e., up and down directions. At this time, if the edge strength of pixel h is higher than that of pixel b, contour trace can no longer move forward based on only a rule "to trace pixels having higher edge strengths in turn" and the screen masks.

To solve this problem, in this embodiment, in addition to the screen masks that limit the moving directions of contour trace, a field limitation that prevents point C of interest from receding is auxiliarily imposed to prevent contour trace from returning to the previous contour trace path, i.e., from moving backward. That is, at the instance when point C of interest has reached the position illustrated in FIG. 14, since point C of interest has moved from pixel h to pixel e, a field limitation is imposed to prevent point C of interest from moving to pixels g, h, and i backward with respect to the moving direction.

In the above description, neighboring pixels are eight pixels that neighbor point C of interest. However, if no detailed contour trace is required or a smoother contour is to be extracted, the same process may be done using neighboring pixels which are separated two or more pixels from point C of interest.

As described above, according to the first embodiment, the following effects can be obtained.

(1) Since the contour extraction process is implemented by comparing local edge strengths, and corresponding point seek of feature points is made by searching local similar points, high processing speed is assured, and a common region of interest can be quickly extracted from a plurality of images.

(2) Since the screen mask that limits the field of view is appropriately set in the contour extraction process every time the point of interest moves, the end point (target point) can be reliably reached while assuring a contour trace path with a high degree of freedom, thus guaranteeing high reliability.

(3) Since the constraint condition of contour trace in the contour extraction process is only "not to recede from the target point", the trace path has a very high degree of freedom, and an indirect contour that reaches the target point from behind in a contour line having a slow change in curvature can be traced. As a result, a large distance can be set between the start and end points of contour extraction, fewer feature points are required, and the corresponding point seek process can be done quicker.

(4) Since new feature points are selected based on the shape of a newly extracted contour line every time it is extracted, a region of interest, the shape of which changes, can be extracted.

Second Embodiment

An image processing apparatus according to the second embodiment of the present invention will be described below. In this embodiment, the same reference numerals denote substantially the same parts as those in the first embodiment, and a detailed description thereof will be omitted.

Figure 15:
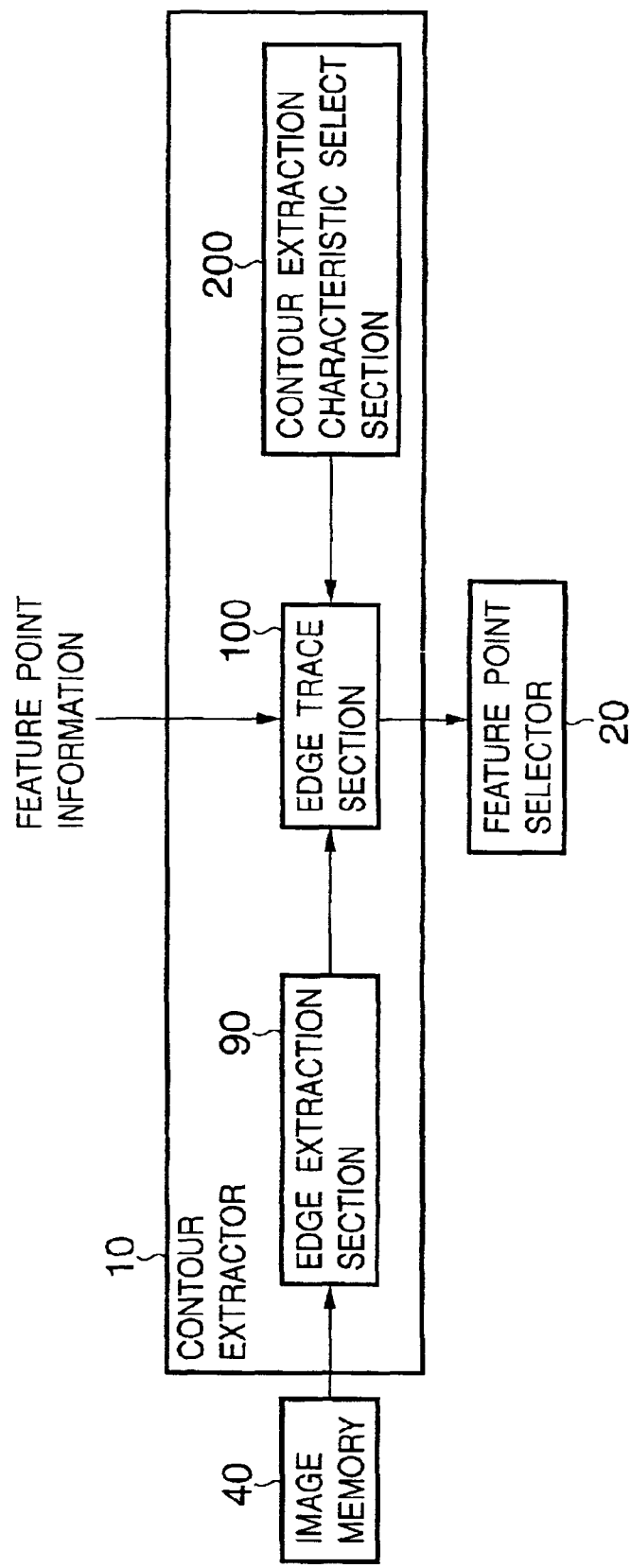
FIG. 15 is a block diagram showing an example of the detailed arrangement of a contour extractor according to the second embodiment.

FIG. 15 is a block diagram showing an example of the detailed arrangement of a contour extractor 10 of the second embodiment. In FIG. 15, a contour extraction characteristic select section 200 that gives different contour extraction characteristics to the edge trace section 100 is added to the arrangement of the contour extractor 10 of the first embodiment shown in FIG. 1.

In the first embodiment, the constraint condition of contour trace is relaxed as much as possible to assure a maximum degree of freedom in trace path. Therefore, when the edge strength of the contour line is relatively higher than those of neighboring edges and noise, contour trace of the first embodiment is very effective. However, if the strengths of edges and noise that neighbor the contour line are higher than the edge strength of the contour line, a trace error is highly likely to occur due to a broader field of view.

Figure 16:
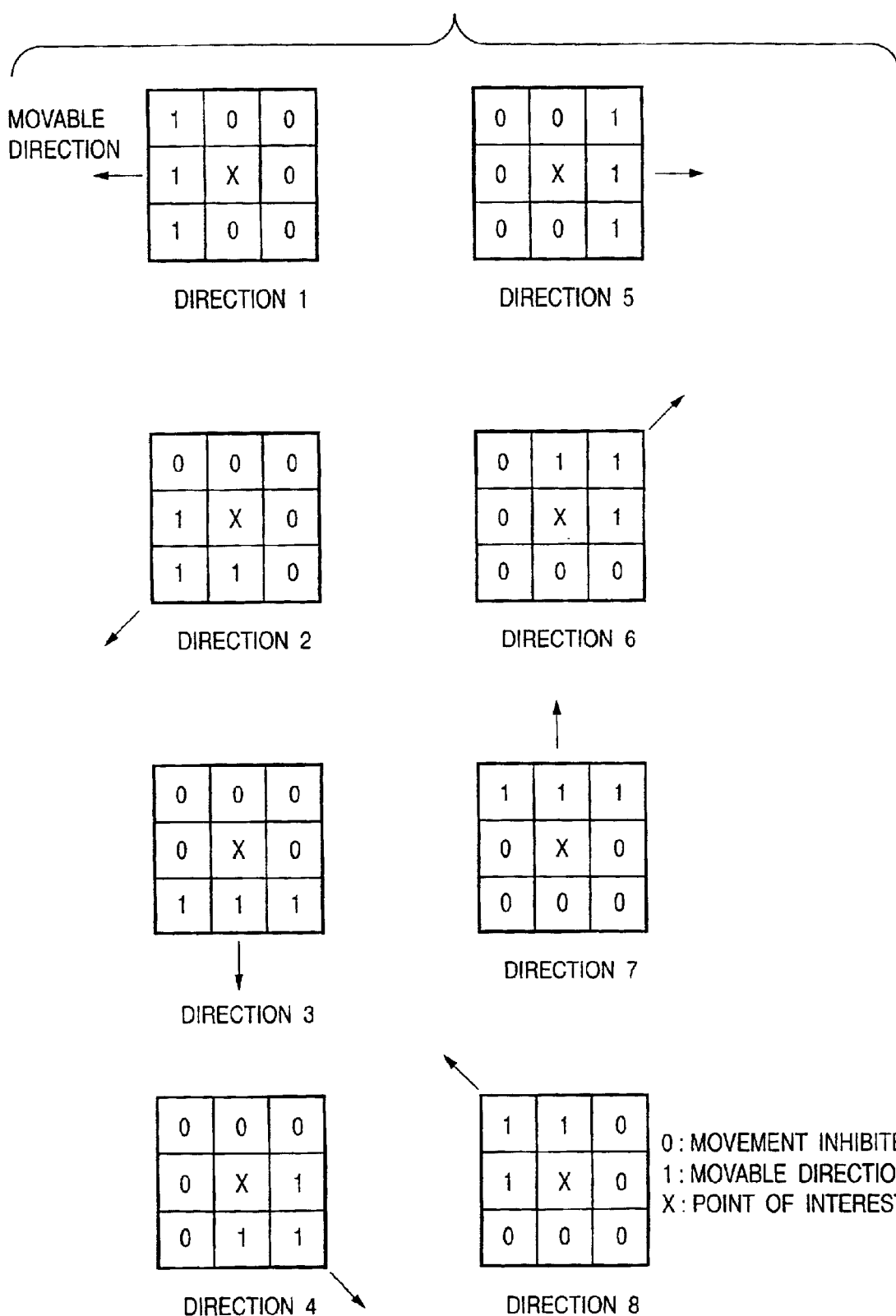
FIG. 16 shows other examples of screen masks.

In the second embodiment, the screen masks shown in FIG. 12, and those shown in FIG. 16 are provided, and one of those masks is selectively used. The screen mask shown in FIG. 12 allows trace in five directions, but the number of traceable directions of the screen mask shown in FIG. 16 is limited to three. This amounts to applying a constraint condition "to always approach the target point" to contour trace. Therefore, according to the screen mask shown in FIG. 16, since the degree of freedom in contour trace path lowers compared to the process using the screen mask shown in FIG. 12, a neighboring edge other than a contour is unlikely to be erroneously detected, resulting in high stability.

FIG. 17 shows the contour traceable range when the screen masks shown in FIG. 16 are used. Range a shown in FIG. 17 indicates a traceable range when point C of interest is located at start point A, and range b a traceable range when point C of interest is located on the contour of range b. In this way, the traceable range reduces as point C of interest becomes closer to target point B, and target point B is finally reached with high reliability.

The contour extraction characteristic select section 200 selects contour extraction characteristics in accordance with the strength, contrast, variance, and the like of an edge in a partial region sandwiched between connected feature points in the edge image obtained by the contour extractor 10. Alternatively, edge trace processes based on different contour extraction characteristics, i.e., using different screen masks, may be parallelly executed, and a desired contour trace result may be selected on the basis of the smoothness, edge strength, contrast, and the like of the extracted contour line.

As described above, according to the second embodiment, the following effects can be obtained in addition to those of the first embodiment.

(5) Since screen masks having stricter field limitations are used, a contour line with a low edge strength, a contour line of a noisy image, and the like can be stably traced without being influenced by a strong edge and noise other than the contour line.

(6) Since the contour extraction characteristics can be adaptively changed by selectively using the screen mask shown in FIG. 16 for a strong edge other than the contour or the screen mask shown in FIG. 12 for a strong edge of the contour line, the application range of contour extraction can be broadened.

Third Embodiment

In the first and second embodiments mentioned above, neighboring pixels of the point of interest undergo binary masking. In the third embodiment, neighboring pixels undergo not only binary masking but also multi-valued weighting to change contour extraction characteristics more smoothly.

FIGS. 18A to 18D show examples of screen masks of direction 5 using multi-valued weighting coefficients. Of course, weighting coefficients shown in FIGS. 18A to 18D are merely examples, and may be changed more finely. The screen masks shown in FIGS. 18A to 18C are equivalent to those shown in FIGS. 12 and 16. On the other hand, the screen mask shown in FIG. 18B has an intermediate constraint condition between those shown in FIGS. 12 and 16, and the screen mask shown in FIG. 18D has a constraint condition stricter than that shown in FIG. 16.

Therefore, when the edge strengths of neighboring pixels of the point of interest are not clearly different from each other, i.e., when an edge is discontinuous or the contrast is low, contour trace that prioritizes a direction toward the target point can be continued by selectively using the weighted screen mask shown n FIG. 18A or 18B. On the other hand, at a position having opposite characteristics, the weighted screen mask shown in FIG. 18C or 18D may be selectively used.

As described above, according to the third embodiment, the following effects can be obtained in addition to the effects of the first and second embodiments.

(7) Even at a position where an edge is unsharp, contour trace can be continued in a direction toward the target point.

(8) Since a plurality of screen masks having different weighting coefficients are prepared, and can be freely selected in correspondence with the image state around the contour, the present invention can be applied to every image contours.

Fourth Embodiment

In the first to third embodiments described above, one-way contour trace from the start point to the end point has been explained. However, when one-way contour trace is made, a wrong direction may be selected at branch paths of an edge. For this reason, in the fourth embodiment, contour trace in the opposite direction is made by replacing the start and end points. The two-way trace effects will be explained below using FIGS. 19 and 20.

Figure 19:
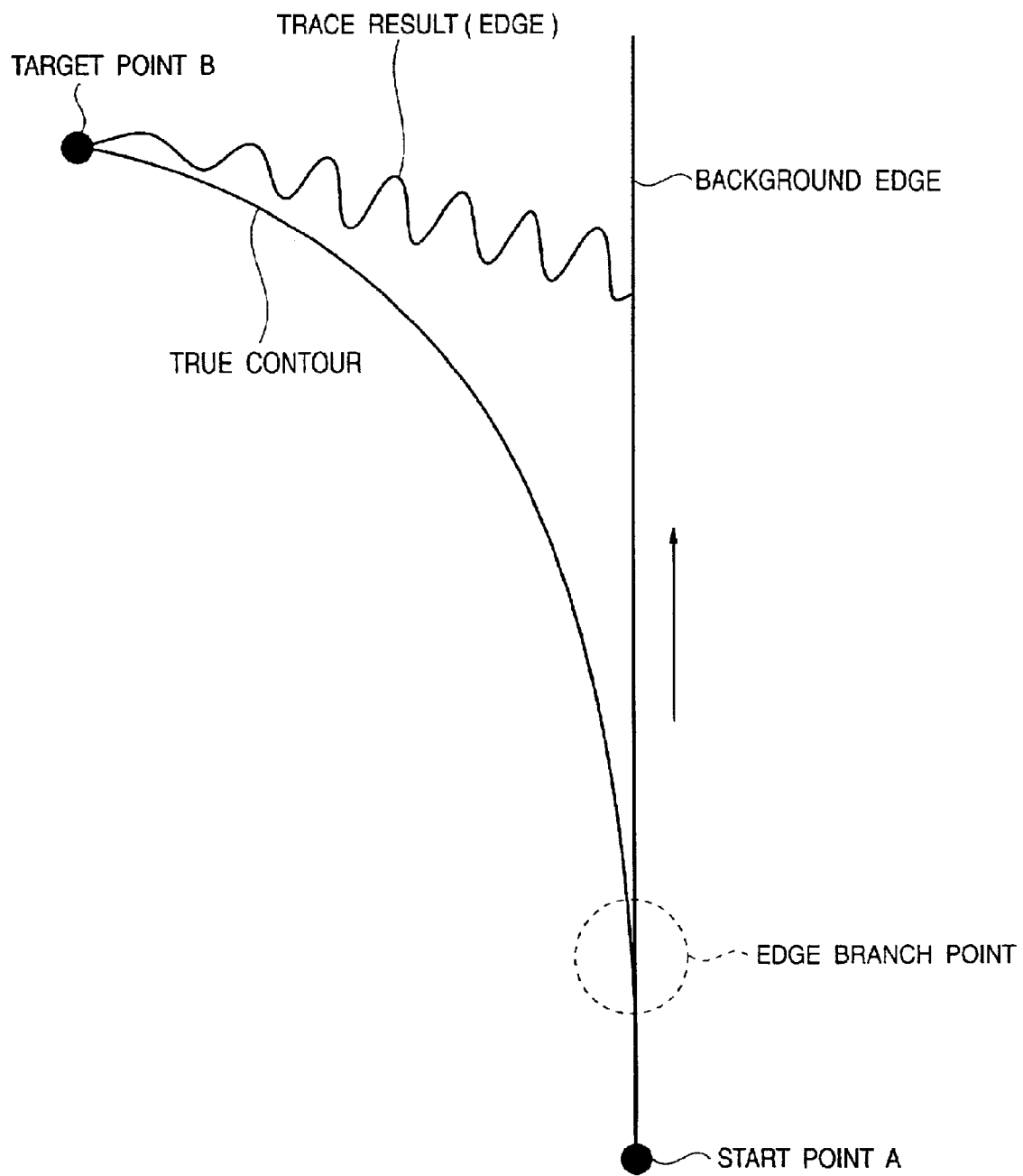
FIG. 19 is a view for explaining a two-way trace effect.
Figure 20:
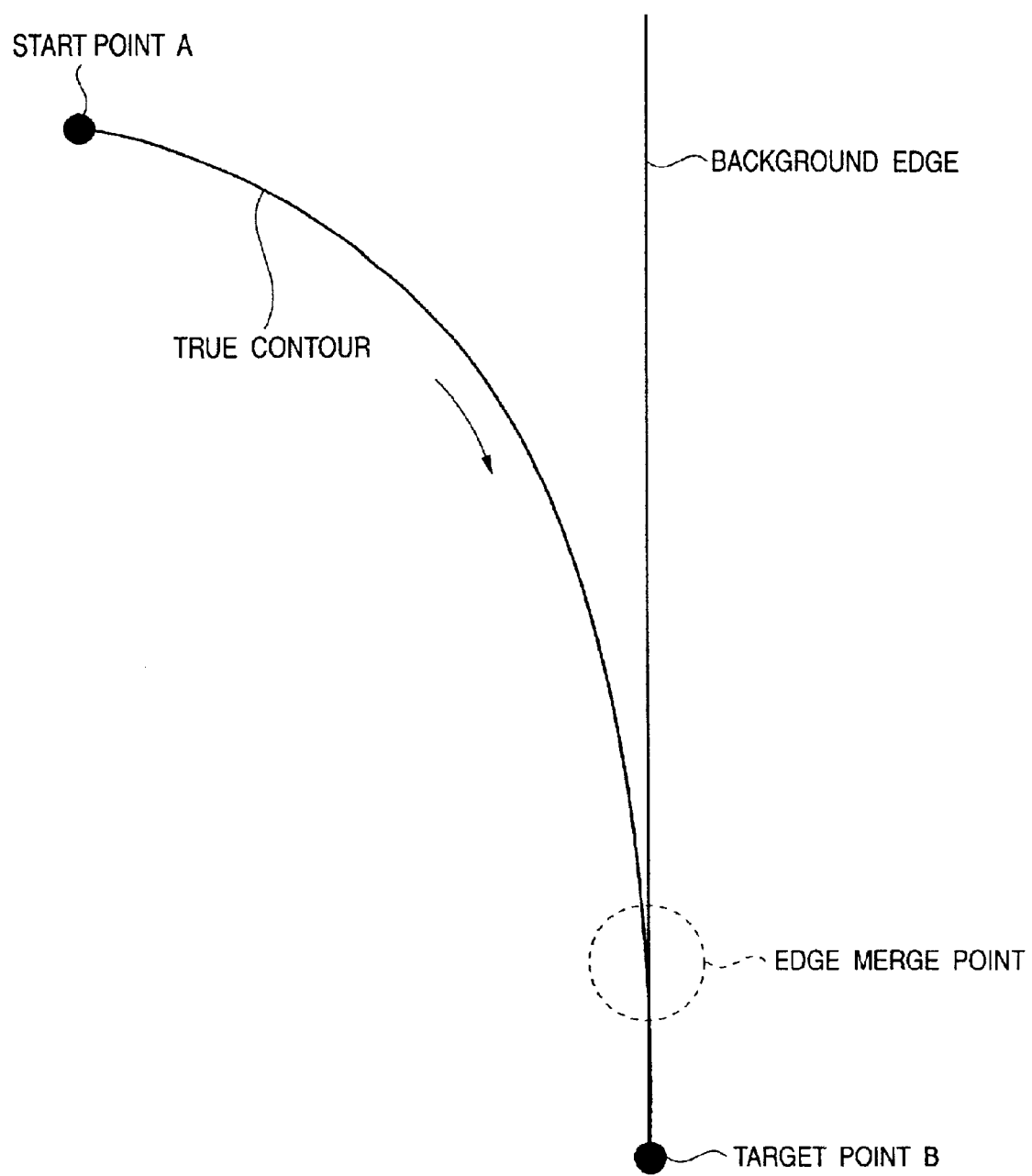
FIG. 20 is a view for explaining a two-way trace effect.

FIGS. 19 and 20 show a true contour line, and a background edge which overlaps that contour line. Assume that the background edge has a higher edge strength than the true contour line. In FIG. 19, start point A is present on the lower side of this figure, end point B is located on the upper side, and a contour is traced from the lower side toward the upper side of the figure. When a contour line is traced in a direction shown in FIG. 19 (to be referred to as a "forward direction" hereinafter), a traced line goes in the direction of the background edge having a higher edge strength, is separated from the background edge under the influences of the screen masks during trace, and then goes toward end point B, as shown in FIG. 19. That is, FIG. 19 shows a typical failure example of edge trace.

On the other hand, since the combination of start point A and end point B in FIG. 20 is reversed to that shown in FIG. 19, contour trace goes from the upper side to the lower side of the figure, i.e., in a direction opposite to that in FIG. 19. Therefore, the branch point of edges in FIG. 19 changes to a merge point of edges in FIG. 20. Of course, since the screen masks do not allow to trace a direction to separate away from target point B, trace can extract a correct contour without turning back in a direction of the background edge at the merge point, irrespective of the presence of a stronger background edge.

FIG. 21 is a flow chart showing the process of the fourth embodiment.

Contour trace shown in FIG. 10 is executed in step S300, and its reliability is evaluated in step S301. This evaluation is achieved by solely using the smoothness of a contour line, the average value of edge strengths on a contour line, the length (path length) of a contour line, or the like, or systematically by weighting and summing up these parameters. The start and end points are replaced in step S302, contour trace shown in FIG. 10 is executed again in step S303, and its reliability is evaluated in step S304. In step S305, the evaluation results of the contour trace results in the two directions are compared to output a contour trace result with higher reliability.

As described above, according to the fourth embodiment, the following effects can be obtained in addition to those of the first to third embodiments.

(9) Since contour trace processes are done in two directions, and a contour trace result with higher reliability is selected, very stable contour trace, which is hardly influenced by an "edge other than a contour" which crosses the contour line, can be realized.

(10) In the fourth embodiment, the effectiveness of two-way contour trace has been explained in consideration of an edge branch point. Of course, since the "edge branch point" is an "edge merge point" when viewed from the opposite direction, very stable contour trace, which is hardly influenced by an "edge other than a contour" can be realized in combination with mask processes which realize constraint conditions such as "to go toward the target point", "not to regress to the previous moving direction", and the like. However, mask processes are not indispensable in two-way contour trace of the fourth embodiment. In some cases, forward and backward contour trace paths near two end points are different from each other due to, e.g., the absence of a sharp edge near the two end points of a contour to be extracted, and contour trace results in two directions consequently indicate quite different paths. Even in such case, since one of the contour trace results in the two directions extracts a true contour line, two-way contour trace is greatly advantageous compared to one-way contour trace.

Fifth Embodiment

The first embodiment uses Freeman chain codes as shape information of a contour line as a feature point select method on the contour line. The fifth embodiment uses image information on or near the contour line in addition to the shape information of the contour line. As an example of image information, the strengths of edges of pixels which form the contour line are referred to. That is, feature point candidates on the contour line are selected on the basis of the shape information of the contour line, and are prioritized on the basis of their edge strengths. Higher priority is assigned to a feature point having higher edge strength, since such point allows corresponding point seek with higher precision in the next frame. A maximum number of feature points, determined by the processing performance of a system that extracts a region of interest, are selected using the prioritizing results.

Also, the fifth embodiment is effective upon determining a pixel of a high-resolution original image corresponding to a feature point extracted from a resolution-reduced image, that has been explained in the first embodiment. That is, when a pixel of an original image with highest reliability is selected from a "coarse pixel region consisting of four pixels of the original image" selected as a feature point in the low-resolution image, the edge strengths of the four pixels of the original image can be compared with each other, and a pixel with highest edge strength is automatically selected.

According to the feature point select method of the fifth embodiment, the following effects are obtained.

(11) Guidelines upon selecting a predetermined number of feature points from many feature point candidates can be given.

(12) A feature point with higher reliability can be selected from many feature point candidates.

(13) A corresponding feature point of a high-resolution image can be obtained from that of a low-resolution image.

Sixth Embodiment

The first embodiment has explained the method of selecting feature points on a contour line using Freeman chain codes as shape information of the contour line, and the fifth embodiment has exemplified a case wherein image information on or near the contour line is used in addition to the shape information of the contour line. In the sixth embodiment, a method of selecting feature points from two-way trace results using the fourth embodiment will be explained.

The principle of the fourth embodiment will be explained below with reference to FIGS. 19 and 20. In forward trace shown in FIG. 19, a background edge having a higher edge strength begins to be traced at the branch point of the background edge that crosses a contour line. However, a line traced up to the branch point is correct. On the other hand, in reverse trace shown in FIG. 20, since the branch point is a merge point of a true contour line and background edge, it does not adversely influence contour trace. Upon comparing the forward and reverse trace results, the trace results between start point A in FIG. 19 and the branch point match, and the trace results between the branch point and end point B in FIG. 19 do not match. In the sixth embodiment, end points of a period where two-way trace results match are selected as feature points.

That is, if the branch point shown in FIG. 19 is selected as a feature point, a branch point from which the traced line deviates can be removed, and a feature point with higher reliability can be selected. When the sixth embodiment is combined with the first or fifth embodiment, the reliability of feature points can be further improved.

According to the sixth embodiment, the following unique effect can be obtained.

(14) Feature points which cannot be selected based on only the shape or edge strengths of the contour line can be selected without any omissions. Especially, this embodiment is effective when a strong edge is present in the background or region of interest.

Seventh Embodiment

The corresponding point seeker 30 of the first embodiment independently performs block matching using blocks each consisting of a feature point and its neighboring pixels. On the other hand, an LSI that detects motion vectors has been developed, and precise motion vectors in an image can be detected in real time. Using such motion vector detection LSI together, a search range in the next frame can be limited by feature points selected on the current frame, and the following unique effect can be obtained.

(15) Since a corresponding point seek range in the next frame can be roughly limited based on the distribution of motion vectors near feature points, the processing efficiency can be improved by omitting an inefficient corresponding point seek process, and correspondence errors of feature points can be eliminated.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   a selector, arranged to select a plurality of feature points on or near a contour line of a region of interest when a contour of the region of interest in a reference image sensed at reference time or viewpoint is input;
   a memory, arranged to store connectivity information on a connectivity between the plurality of selected feature points;
   a seeker, arranged to seek a plurality of corresponding points, which respectively correspond to the plurality of feature points, in an image to be sought, which is sensed at another time or viewpoint; and
   an extractor, arranged to extract a contour between the plurality of corresponding points as a region of interest of the image to be sought on the basis of the connectivity information stored in said memory,
   wherein said extractor respectively sets as start and end points two of the corresponding points that have substantially a same connectivity as the selected feature points, and performs a trace between the start and end points in accordance with a predetermined set of directions to extract the contour.

2. The apparatus according to claim 1, wherein said selector uses at least some of the plurality of corresponding points as feature points used to extract the region of interest of the image to be sought.

3. The apparatus according to claim 1, wherein said selector selects the feature points on the basis of shape information of the contour of the region of interest.

4. The apparatus according to claim 1, wherein said selector selects the feature points on the basis of image information on or near the contour line of the region of interest.

5. The apparatus according to claim 1, wherein said extractor sequentially traces pixels with high edge strengths.

6. The apparatus according to claim 5, wherein said extractor performs the trace in two directions by replacing the corresponding points as the start and end points with each other, and selects one of trace results.

7. The apparatus according to claim 6, wherein said selector selects new feature points on the basis of a period where the results of the traces performed in the two directions match.

8. The apparatus according to claim 5, wherein said extractor performs masking of neighboring pixels in correspondence with a positional relationship between a point of interest and the end point upon comparing edge strengths of the neighboring pixels at the point of interest in the trace so as to determine the set of directions.

9. The apparatus according to claim 8, wherein the masking uses a mask corresponding to an angle the point of interest and the end point make with each other.

10. The apparatus according to claim 9, wherein the masking limits a field of view of the trace so as to prevent the point of interest from moving away from the end point.

11. The apparatus according to claim 8, wherein the masking limits a field of view of the trace so as to make the point of interest always approach the end point.

12. The apparatus according to claim 8, wherein the masking limits a field of view of the trace so as to prevent the point of interest from returning to a previous path thereof.

13. The apparatus according to claim 8, wherein the extractor comprises a plurality of sets of masks having different field limitation characteristics, and selectively uses the plurality of sets of masks in correspondence with image information of a trace period.

14. The apparatus according to claim 8, wherein the extractor comprises a plurality of sets of masks having different weighting coefficients, and selectively uses the plurality of sets of masks in correspondence with image information of a trace period.

15. An image processing method comprising the steps of:
   selecting a plurality of feature points on or near a contour line of a region of interest when a contour of the region of interest in a reference image sensed at reference time or viewpoint is input;
   storing connectivity information on a connectivity between the plurality of selected feature points in a memory;
   seeking a plurality of corresponding points, which respectively correspond to the plurality of feature points, in an image to be sought, which is sensed at another time or viewpoint;
   respectively setting as start and end points two of the plurality of corresponding points that have substantially a same connectivity as the selected feature points; and
   performing a trace between the start and end points in accordance with a predetermined set of directions to extract a contour between the plurality of corresponding points as a region of interest of the image to be sought.

16. A computer program product stored in a computer readable medium comprising computer program code, for an image processing method, said method comprising process the steps of:

selecting a plurality of feature points on or near a contour line of a region of interest when a contour of the region of interest in a reference image sensed at reference time or viewpoint is input;

storing connectivity information on a connectivity between the plurality of selected feature points in a memory;

seeking a plurality of corresponding points, which respectively correspond to the plurality of feature points, in an image to be sought, which is sensed at another time or viewpoint;

respectively setting as start and end points two of the plurality of corresponding points that have substantially a same connectivity as the selected feature points; and performing a trace between the start and end points in accordance with a predetermined set of directions to extract a contour between the plurality of corresponding points as a region of interest of the image to be sought.

* * * * *

UNITED STATES PATENT AND TRADEMARK OFFICE
CERTIFICATE OF CORRECTION

PATENT NO. : 6,862,369 B2
DATED : March 1, 2005
INVENTOR(S) : Toshiaki Kondo

It is certified that error appears in the above-identified patent and that said Letters Patent is hereby corrected as shown below:

<u>Title page,</u>
Item [56], References Cited, OTHER PUBLICATIONS,
"Kass, Michael, A. Witkin, D. Terzopoulos, Snakes: Active Contour Models, International Journal of Computer Vision, vol. 1, No. 4, 1987, pp. 321-331." should read
-- Kass, Michael, A. Witkin, D. Terzopoulos, "Snakes: Active Contour Models", International Journal of Computer Vision, vol. 1, No. 4, 1987, pp. 321-331. --.

<u>Column 1,</u>
Line 29, "parent" should read -- patent --.

<u>Column 10,</u>
Line 54, "n" should read -- in --; and
Line 67, "contours." should read -- contour. --.

<u>Column 13,</u>
Line 23, "LSI together," should read -- LSI together with a corresponding point seeker --.

<u>Column 14,</u>
Line 66, "process" should be deleted.

Signed and Sealed this

Twenty-eighth Day of March, 2006

JON W. DUDAS
*Director of the United States Patent and Trademark Office*